(12) United States Patent
McCorry et al.

(10) Patent No.: US 7,984,551 B2
(45) Date of Patent: Jul. 26, 2011

(54) FABRICATED VEHICLE WHEEL AND METHOD FOR PRODUCING SAME

(75) Inventors: Patrick McCorry, Plymouth, MI (US); Tom Czarniecki, Dearborn, MI (US); Monty Csapo, Livonia, MI (US); Todd Duffield, Westland, MI (US); Matthias Grutgen, Konigswinter (DE); Frank Kramer, Cologne (DE); Alan Coleman, Southgate, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 1092 days.

(21) Appl. No.: 10/591,682

(22) PCT Filed: Mar. 18, 2005

(86) PCT No.: PCT/US2005/009206
§ 371 (c)(1),
(2), (4) Date: May 29, 2007

(87) PCT Pub. No.: WO2005/089977
PCT Pub. Date: Sep. 29, 2005

(65) Prior Publication Data
US 2008/0034587 A1    Feb. 14, 2008

(51) Int. Cl.
*B21D 31/02* (2006.01)
*B21J 13/00* (2006.01)
*B23P 17/00* (2006.01)

(52) U.S. Cl. .............. 29/894.323; 29/894; 29/894.325; 72/325; 72/355.4; 301/64.101

(58) Field of Classification Search ............... 29/894, 29/894.323, 894.325, 894.012; 72/324, 325, 72/327, 353.2, 353.6, 354.6, 355.2, 356, 72/358, 326; 301/64.101, 64.102, 64.704
See application file for complete search history.

(56) References Cited

U.S. PATENT DOCUMENTS

| | | | | |
|---|---|---|---|---|
| 3,391,439 A | * | 7/1968 | Bulgrin et al. | 29/894.325 |
| 3,442,110 A | * | 5/1969 | Hogan et al. | 72/327 |
| 4,659,148 A | | 4/1987 | Grill | |
| 5,388,330 A | | 2/1995 | Daudi | |
| 5,533,260 A | | 7/1996 | Kier, Jr. | |
| 6,754,957 B2 | * | 6/2004 | Coleman et al. | 29/894.344 |
| 7,523,635 B2 | * | 4/2009 | Ono | 72/356 |

FOREIGN PATENT DOCUMENTS

| CN | 1041894 A | 5/1990 |
|---|---|---|
| WO | WO 03/037651 A1 | 5/2003 |

* cited by examiner

*Primary Examiner* — David P Bryant
*Assistant Examiner* — Alexander P Taousakis
(74) *Attorney, Agent, or Firm* — MacMillan, Sobanski and Todd, LLC

(57) ABSTRACT

This invention relates to a fabricated vehicle wheel and method for producing the same. The wheel includes a rim and a disc secured to the rim. The disc includes a plurality of outwardly extending spokes, an outer rim connecting flange defining a side edge surface and a window formed therein between adjacent pairs of spokes and having a predetermined shape defined by the adjacent pairs of spokes and the side edge surface of the rim connecting flange such that each of the windows extends to an outermost periphery of the wheel disc, at least one of the windows includes at least a first window portion and a second window portion, the first window portion being formed by a first piercing operation and the second window portion being formed by a second piercing operation.

23 Claims, 11 Drawing Sheets

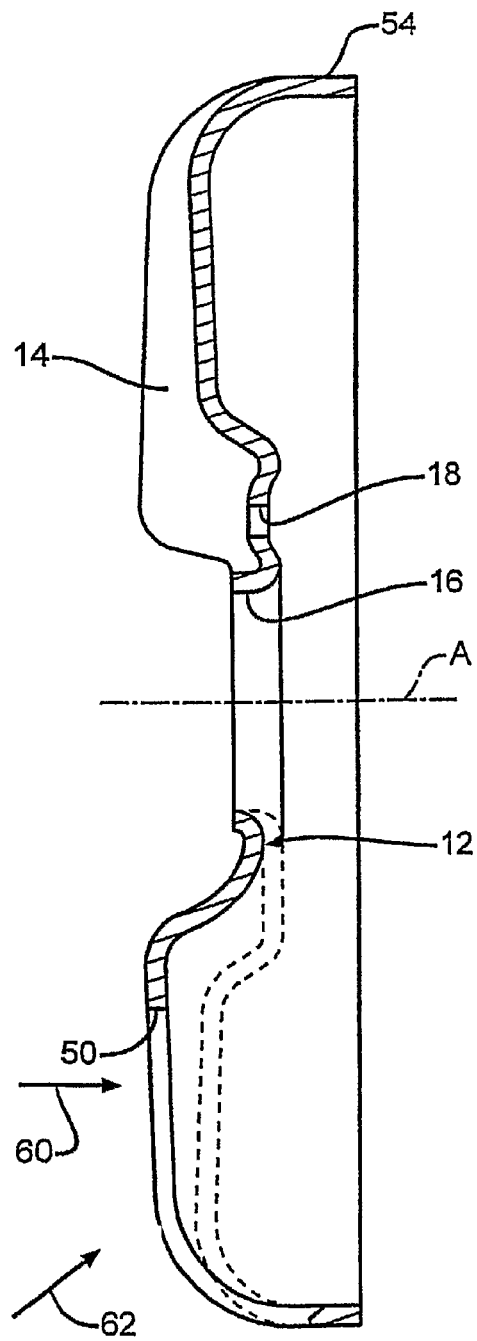
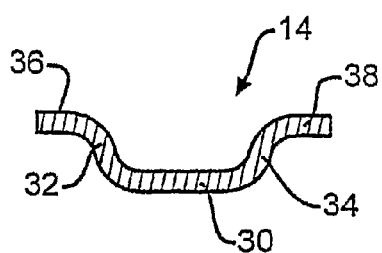
FIG. 4
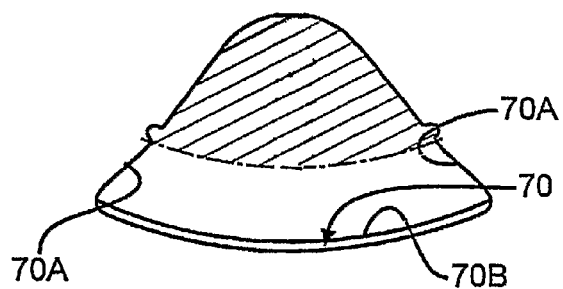
FIG. 5
FIG. 3
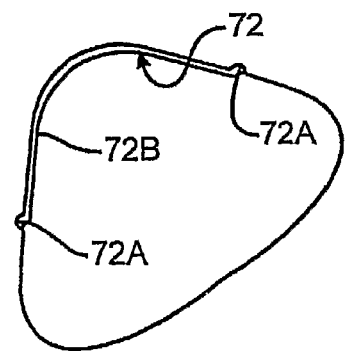
FIG. 6

FABRICATED VEHICLE WHEEL AND METHOD FOR PRODUCING SAME

BACKGROUND OF THE INVENTION

This invention relates in general to vehicle wheels and in particular to an improved fabricated vehicle wheel.

A conventional fabricated vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

SUMMARY OF THE INVENTION

This invention relates to a fabricated vehicle wheel and method for producing the same. The wheel includes a rim and a disc secured to the rim. The disc includes a plurality of outwardly extending spokes, an outer rim connecting flange defining a side edge surface and a window formed therein between adjacent pairs of spokes and having a predetermined shape defined by the adjacent pairs of spokes and the side edge surface of the rim connecting flange such that each of the windows extends to an outermost periphery of the wheel disc, at least one of the windows includes at least a first window portion and a second window portion, the first window portion being formed by a first piercing operation and the second window portion being formed by a second piercing operation. The method for producing the wheel of the present invention includes the steps of: (a) providing a rim; (b) providing a disc having a plurality of outwardly extending spokes and an outer rim connecting flange defining a side edge surface; (c) subjecting the disc to at least a first window piercing operation to produce a first window portion in the disc between a pair of adjacent spokes; (d) subjecting the disc to at least a second window piercing operation to produce a second window portion in the disc, the first window portion and the second window portion cooperating to define a pierced window in the disc having a predetermined shape defined by the adjacent pairs of spokes and the side edge surface of the rim connecting flange such that each of the pierced windows extends to an outermost periphery of the disc; and (e) securing the disc and the rim together to produce the fabricated vehicle wheel.

Other advantages of this invention will become apparent to those skilled in the art from the following detailed description of the preferred embodiments, when read in light of the accompanying drawings.

BRIEF DESCRIPTION OF THE DRAWINGS

FIG. 3 is a sectional view of the wheel disc taken along line 3-3 of FIG. 2.

FIG. 4 is a sectional view of the wheel disc taken along line 4-4 of FIG. 2.

FIG. 5 is a view of a portion of the wheel disc showing a first portion of a window formed in the wheel disc.

FIG. 6 is a view of a portion of the wheel disc showing a second portion of the window formed in the wheel disc.

DESCRIPTION OF THE PREFERRED EMBODIMENTS

Figure 1:
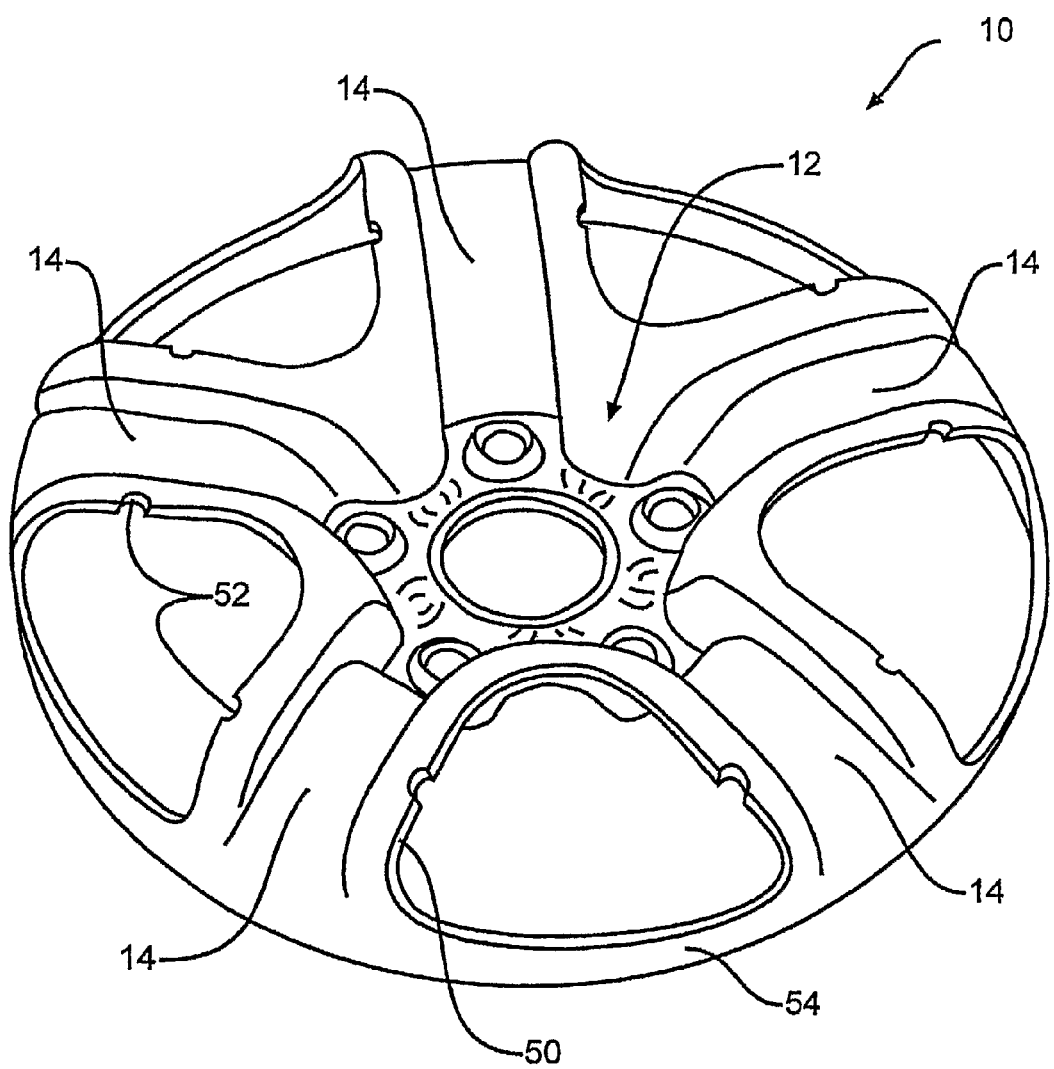
FIG. 1 is a perspective view of a first embodiment of a wheel disc according to the present invention adapted for use in producing a fabricated vehicle wheel.
Figure 2:
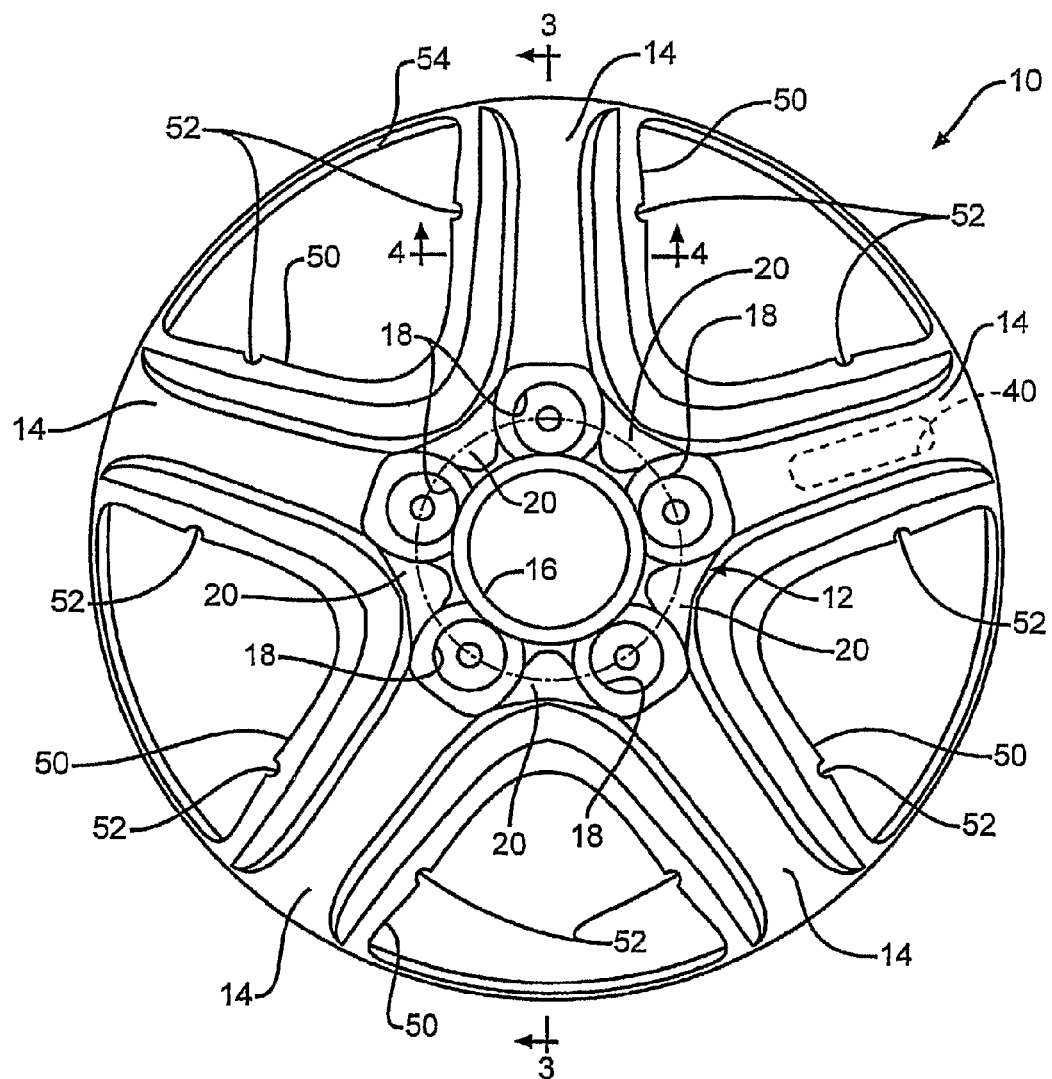
FIG. 2 is a front plan view of the wheel disc illustrated in FIG. 1.

Referring now to the drawings, there is illustrated in FIGS. 1-3 a first embodiment of a wheel disc, indicated generally at 10, produced in accordance with the present invention. The wheel disc 10 of this invention is illustrated as being adapted for use in a fabricated "drop center" or "well attached" vehicle wheel, such as shown in FIGS. 23-27 of U.S. Publication No. 2004/0227392, the disclosure of this published application incorporated by reference in entirety herein. Although the present invention is illustrated and described in conjunction with the particular vehicle wheel constructions disclosed herein, it will be appreciated that the invention can be used in conjunction with other types of vehicle wheel constructions. For example, the wheel disc 10 can be used in other types of fabricated wheels, such as for example in a "bead seat attached" wheel such as shown in FIG. 4 of U.S. Pat. No. 5,188,429 to Heck et al., the disclosure of this patent incorporated by reference in entirety herein.

As shown in FIGS. 1-3, the wheel disc 10 is preferably fabricated or otherwise formed from a suitable material, such as for example, steel. The wheel disc 10 includes a generally centrally located wheel mounting surface or portion 12 and a plurality of outwardly extending spokes 14. In the illustrated embodiment, the wheel disc 10 includes five of such spokes 14 which are shown as being formed integral with the wheel mounting surface 12. Alternatively, the number and/or the construction of one or more of the spokes 14 can be other than illustrated if so desired. For example, the wheel disc 10 can include less than five spokes 14 or more than five spokes 14 and/or the spokes 14 can be formed separate from the wheel mounting surface 12 of the wheel disc 10 and joined thereto by a suitable method.

The wheel mounting surface 12 is provided with a centrally located pilot aperture 16 and a plurality of lug bolt receiving holes 18 circumferentially spaced around the pilot aperture 16. In the illustrated embodiment, the wheel mounting surface 12 includes five of such lug bolt receiving holes 18 which are preferably provided in the wheel mounting surface 12 "in line" with a respective one of each of the spokes 14. Alternatively, the number and/or the location of the lug bolt receiving holes 18 can be other than illustrated if so desired. The lug bolt receiving holes 18 are adapted to receive lug bolts (not shown) and nuts (not shown) for securing the wheel disc 10, and therefore the vehicle wheel, on an axle (not shown) of a vehicle.

The mounting surface 12 further includes a plurality of "strengthening" ribs 20 provided therein. In the illustrated embodiment, a rib 20 is located between each pair of lug bolt receiving holes 18. In the illustrated embodiment, each of the ribs 20 is defined by a raised or embossed area which extends outwardly from or above the mounting surface 12. The ribs 20 are operative to strengthen the mounting surface 12 to keep it from flexing during vehicle operation thereby improving the fatigue life of the associated vehicle wheel. Alternatively, the spacing, location, number and/or configuration of the ribs 20 can be other than illustrated and described if so desired.

Each of the spokes 14 has a generally double-Z-shaped cross-section as shown in FIG. 4 and includes a generally flat rear or back wall 30, a pair of opposed side walls 32 and 34 extending outwardly from the rear wall 30, and an pair of front walls 36 and 38 extending a respective one of the side walls 32 and 34. In the illustrated embodiment, the rear wall 30 and the front walls 36 and 38 extend generally parallel to one another. Alternatively, the structure, profile, shape and number of one or more of the spokes 14 can be other than illustrated if so desired. Also, one or more of the spokes 14 can include one or more openings formed therein, such as illustrated by an opening 40 shown in phantom in of the spokes 14 in FIG. 2.

The wheel disc 10 further includes a plurality of windows 50 formed therein between each pair of spokes 14 and preferably as illustrated, a continuous outer ring or rim connecting flange 54. As will be discussed below, the windows 50 are formed by a piercing process in accordance with the method of the present invention through two planes of the associated wheel disc 10. The first plane is generally parallel with respect to an axis X of the wheel disc 10 and is illustrated by arrow 60 in FIGS. 3 and 8. The second plane is generally at an angle with respect to the wheel disc axis X and is illustrated by arrow 62 in FIGS. 3 and 8. The angle is in the range of from about 0 degrees to about 45 degrees. Preferably, the angle is approximately 30 degrees. As used herein, the term "piercing" broadly means to remove material from the wheel disc with suitable tooling, such as for example a punch and die, and piercing can also be used to refer to or encompass other known processes, such as trimming, notching, stamping, shearing, scarfing and cutting.

Preferably, as illustrated, the rim connecting flange 54 extends solely in an axial direction and is joined to an associated surface of a wheel rim (not shown) by suitable means to produce the fabricated vehicle wheel. The wheel disc 10 can be joined to the wheel rim by any suitable method, such as for example, by welding or riveting. The rim connecting flange 54 defines a side edge surface 54A extending between adjacent pairs of the spokes 14. Alternatively, the rim connecting flange 54 can be other than illustrated if so desired. For example, the rim connecting flange 54 can be non-continuous, i.e., can include a separate, individual section(s) provided at an outer end of each of the spokes 14 or can be eliminated and the outer end of each of the spokes 14 can be directly connected to the wheel rim.

In the illustrated embodiment, each of the windows 50 is identical to one another and has a pair clearance openings or zones, identified generally at 52. Each of the windows 50 is formed in the wheel disc 10 between adjacent pairs of the spokes 14 and has a predetermined shape defined by the adjacent pairs of spokes and the side edge surface 54A of the rim connecting flange 54 such that each of the windows 50 extends to an outermost periphery of the wheel disc 10. Alternatively, the shape of one or more of the windows 50 can be other than illustrated if so desired. Also, one or both of the planes can be other than the planes illustrated by the arrows 60 and 62 if so desired.

Figure 7:
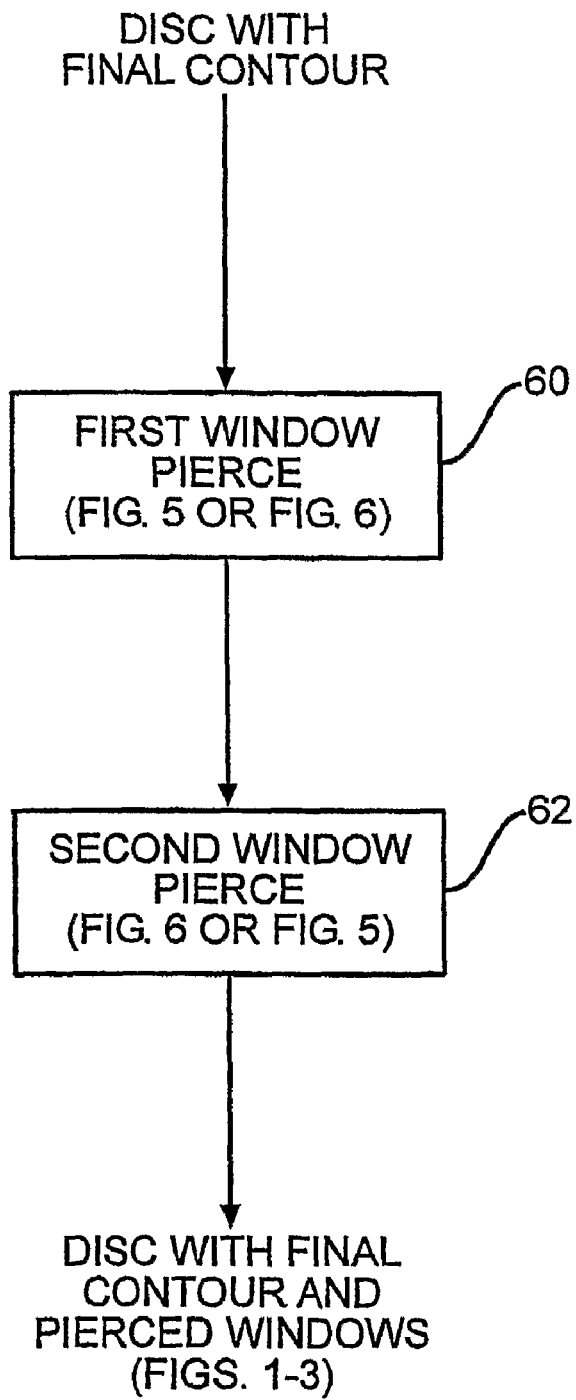
FIG. 7 is a block diagram illustrating a sequence of steps for producing the wheel disc in accordance with the present invention.
Figure 8:
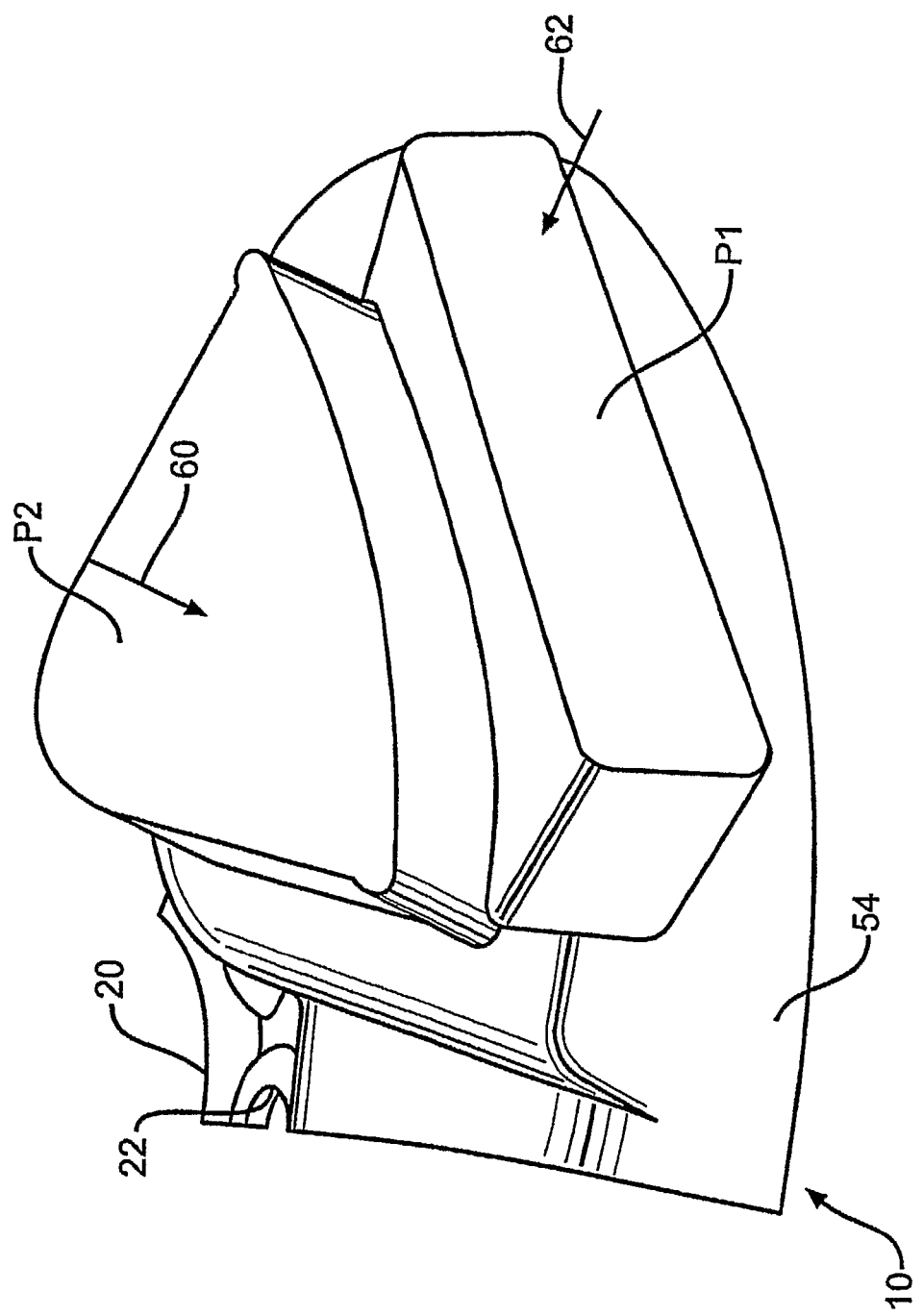
FIG. 8 is a view of a portion of the wheel disc illustrated in FIGS. 1-3, showing tooling for forming a window in the wheel disc in accordance with the present invention.

Referring now to FIG. 7, there is illustrated a block diagram showing a sequence of steps for producing the wheel disc 10 of the present invention, as illustrated in FIGS. 1-3. Initially, in step 60, a preformed fabricated wheel disc having a final contour or shape is subjected to a first window piercing operation to produce a portion of the window in the wheel disc. In the illustrated embodiment and according to one method of forming the windows 50, during step 60 a first or "outer" window portion 70 is formed in the wheel disc during a first pierce operation by a first pierce punch P1 which is moved generally in the direction of the arrow 60, as best shown in FIG. 8. As shown in FIG. 6, the first window portion 70 includes a pair of side walls 70A and a lower wall 70B.

Next, in step 62, a second or "inner" window portion 72 is formed in the wheel disc 10 during a second pierce operation by a second pierce punch P2 which is moved generally in the direction of the arrow 62, as shown in FIG. 8. As best shown in FIG. 5, the second window portion 72 includes a pair of openings 72A formed at the associated remote ends thereof. The openings 72A define a break or departure from a profile 72B of the second window portion 72 for a purpose to be discussed below.

Alternatively, the shape of one or both of the openings 72A can be other than illustrated if so desired. For example, the openings 72A could be oval-shaped, triangular-shaped, square or any other suitable shape if so desired. Also, the order of forming the first window portion 70 and the second window portion 72 in the wheel disc 10 can be reversed if so desired. In other words, the inner window portion 72 can be formed first followed by forming the outer window portion 70. Further, instead of only the punch P2 forming the openings 72A, the punch P2 by itself or a combination of the punches P1 and P2 could be operative to form the openings 72A in the window 50. Also, it is preferred that the disc with final contour provided prior to step 60 is fully finish formed except for the windows 50. However, the disc provided prior to step 60 can be non fully finished if so desired. For example, following step 62, additional finishing operations, such as piercing the lug bolt holes 18 and the center pilot hole 16, can be performed.

The openings 72A formed in the windows 50 are operative to define or provide clearance or overlapping zones, identified in FIG. 2 by reference number 52. The clearance zone 52 eliminates the concern of positioning the two window piercing operations exactly. In other words, without the clearance zones 52, it would be difficult to precisely line up or align the profile 72B of the inner window portion 72 with the side walls 70A of the outer window portion 70 with one another which are formed during the two piercing operations. The clearance zones 52 also reduce or eliminate the possibility of a rough edge due to non exact alignment of the two window piercing operations. Additionally, the exact shape of the clearance zones 52 can be preselected and thereby incorporated into the final shape of the windows 50 of the wheel disc 10 if so desired.

Referring now to FIGS. 8-12, there is illustrated a second embodiment of a wheel disc, indicated generally at 110, in accordance with the present invention. As shown therein, the wheel disc 110 is preferably fabricated or otherwise formed from a suitable material, such as for example, steel, aluminum or alloys thereof, steel, magnesium, or titanium. The wheel disc 110 includes a generally centrally located wheel mounting surface or portion 112 and a plurality of outwardly extending spokes 114. In the illustrated embodiment, the wheel disc 110 includes five of such spokes 114 which are shown as being formed integral with the wheel mounting surface 112. Alternatively, the number and/or the construction of the spokes 114 can be other than illustrated if so desired. For example, the wheel disc 110 can include less than five spokes 114 or more than five spokes 114 and/or the spokes 114 can be formed separate from the wheel mounting surface 112 of the wheel disc 110 and joined thereto by a suitable method.

The wheel mounting surface 112 is provided with a centrally located pilot aperture 120 and a plurality of lug bolt receiving holes 122 circumferentially spaced around the pilot aperture 120. In the illustrated embodiment, the wheel mounting surface 112 includes five of such lug bolt receiving holes 122 which are preferably provided in the wheel mounting surface 112 "in line" with a respective one of each of the spokes 114. Alternatively, the number and/or the location of the lug bolt receiving holes 122 can be other than illustrated if so desired. The lug bolt receiving holes 122 are adapted to receive lug bolts (not shown) and nuts (not shown) for securing the wheel disc 110, and therefore the vehicle wheel, on an axle (not shown) of a vehicle.

The mounting surface 112 further includes a plurality of "strengthening" ribs 124 provided therein. In the illustrated embodiment, a rib 124 is located between each pair of lug bolt receiving holes 122. In the illustrated embodiment, each of the ribs 124 is defined by a raised or embossed area which extends outwardly from or above the mounting surface 112. The ribs 124 are operative to strengthen the mounting surface 112 to keep it from flexing during vehicle operation thereby improving the fatigue life of the associated vehicle wheel. Alternatively, the spacing, location, number and/or configuration of the ribs 124 can be other than illustrated and described if so desired.

Each of the spokes 114 has a generally double-Z-shaped cross-section (similar to that shown above in FIG. 4 with respect to wheel disc 10), and includes a generally flat rear or back wall 130, a pair of opposed side walls 132 and 134 extending outwardly from the rear wall 130, and an pair of front walls 136 and 138 extending a respective one of the side walls 132 and 134. In the illustrated embodiment, the rear wall 130 and the front walls 136 and 138 extend generally parallel to one another. Alternatively, the structure, profile, shape and number of one or more of the spokes 114 can be other than illustrated if so desired. Also, one or more of the spokes 114 can include one or more openings formed therein, such as illustrated by an opening 140 shown in phantom in of the spokes 114 in FIG. 9.

The wheel disc 110 further includes a plurality of windows or openings 150 formed therein between each pair of spokes 114 and preferably as illustrated, a continuous outer ring or band 154. As will be discussed below, the windows 150 are formed by a piercing process in accordance with the method of the present invention through three planes of the associated wheel disc 110.

Figure 10:
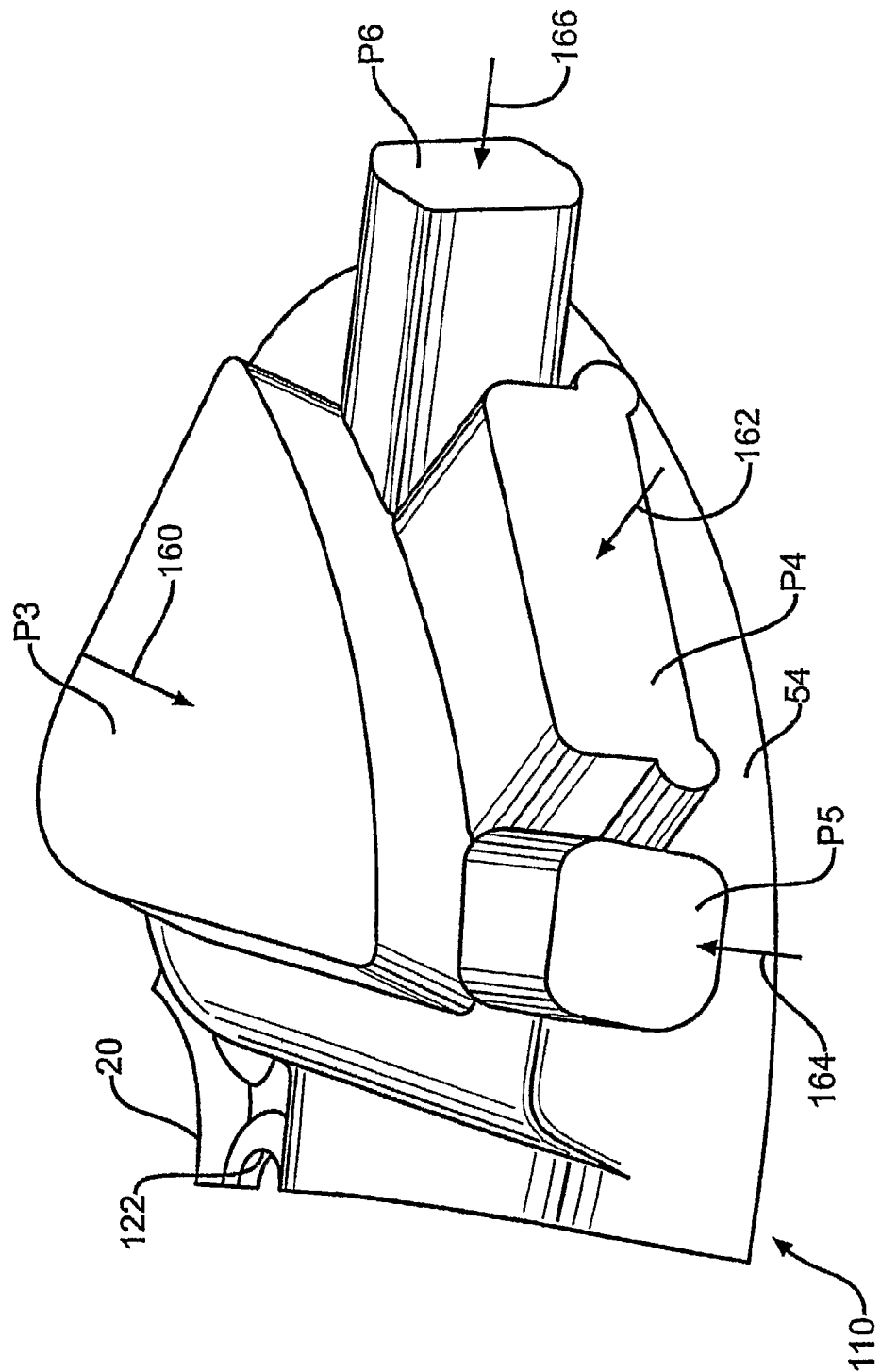
FIG. 10 is a view of a portion of the wheel disc illustrated in FIG. 9, showing tooling for forming a window in the wheel disc in accordance with the present invention.
Figure 11:
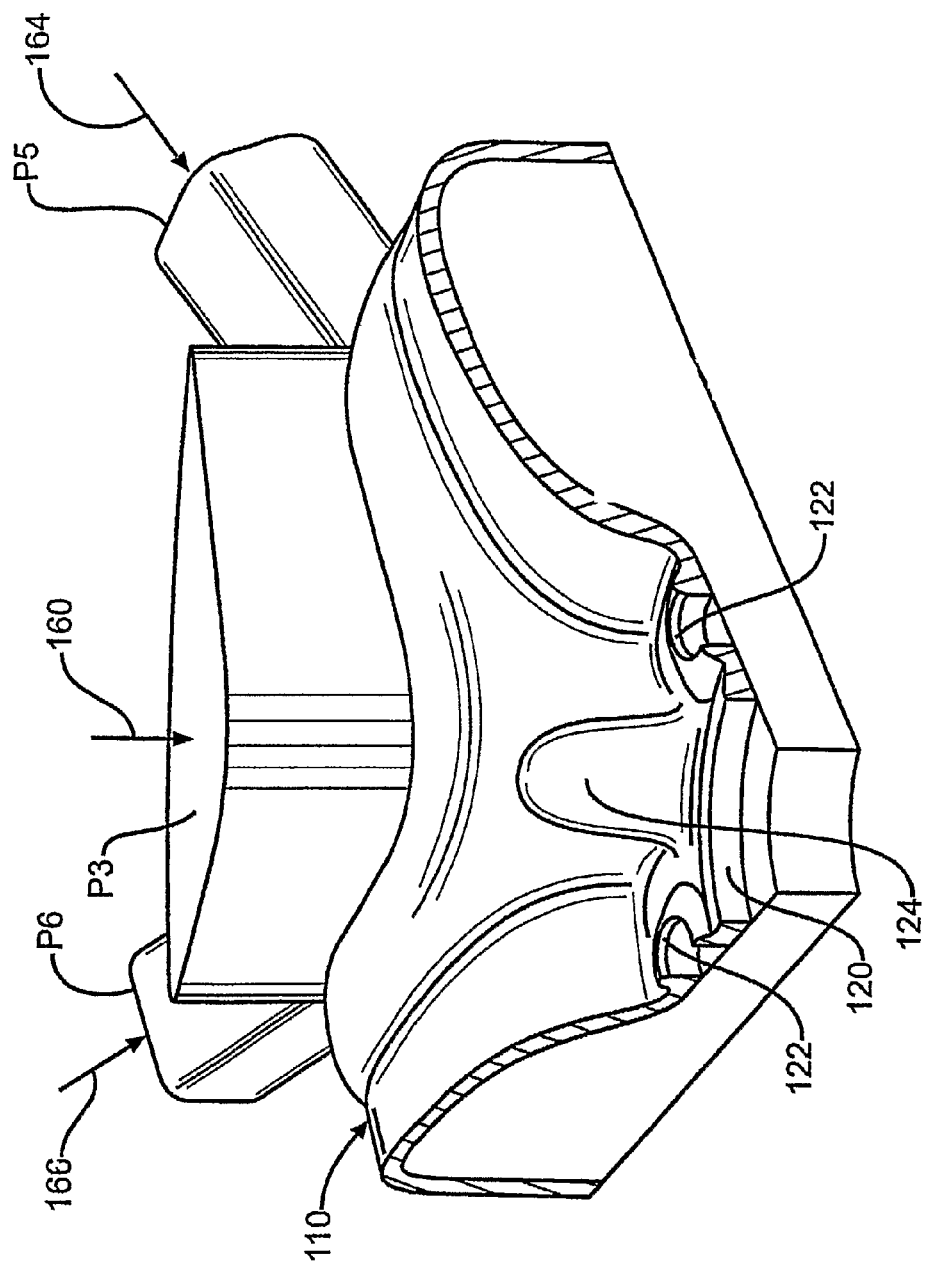
FIG. 11 is another view of a portion of the wheel disc illustrated in FIG. 9, showing the tooling for forming a window in the wheel disc in accordance with the present invention.
Figure 12:
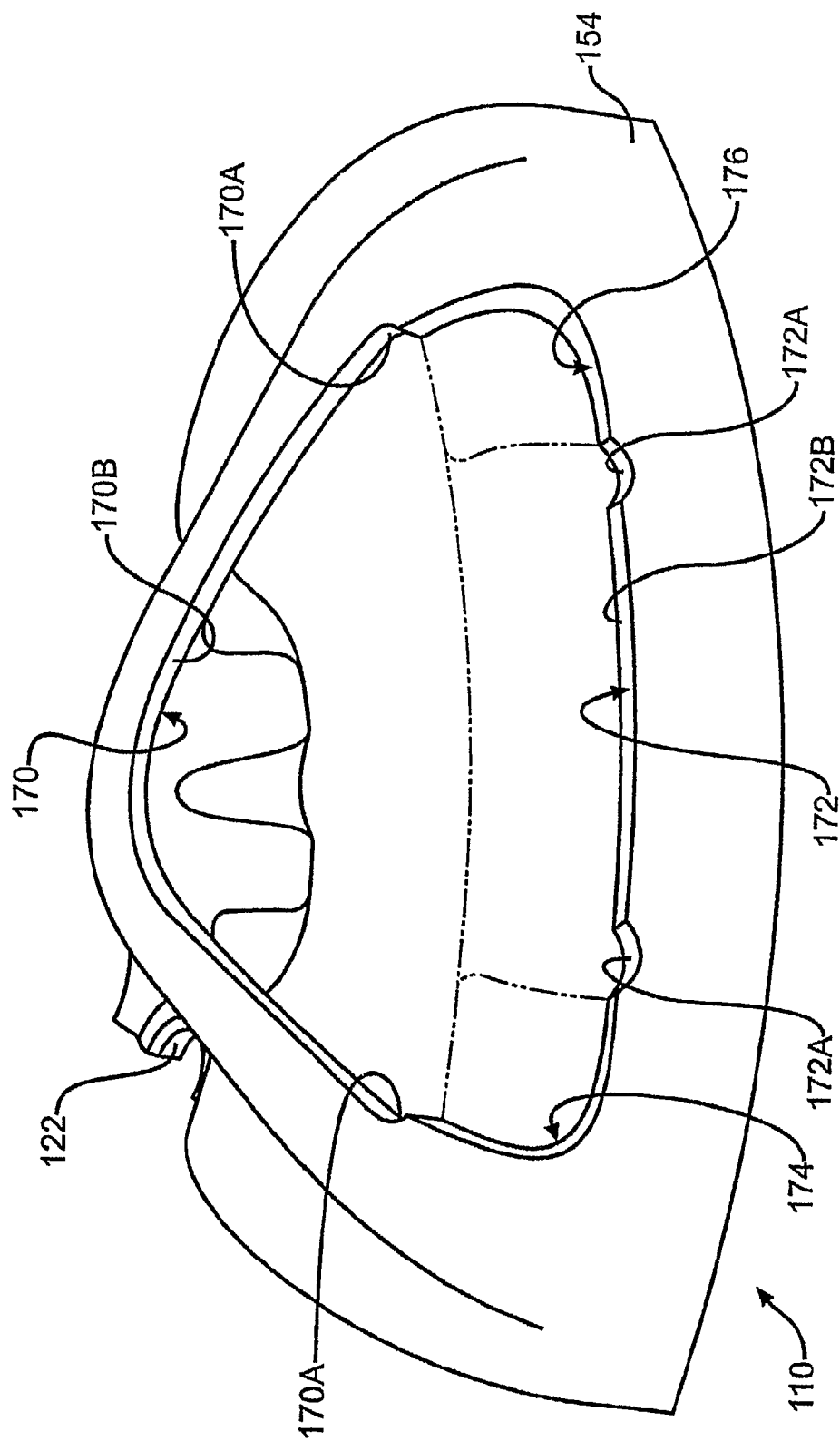
FIG. 12 is a view of a portion of a wheel disc in accordance with the present invention.
Figure 13:
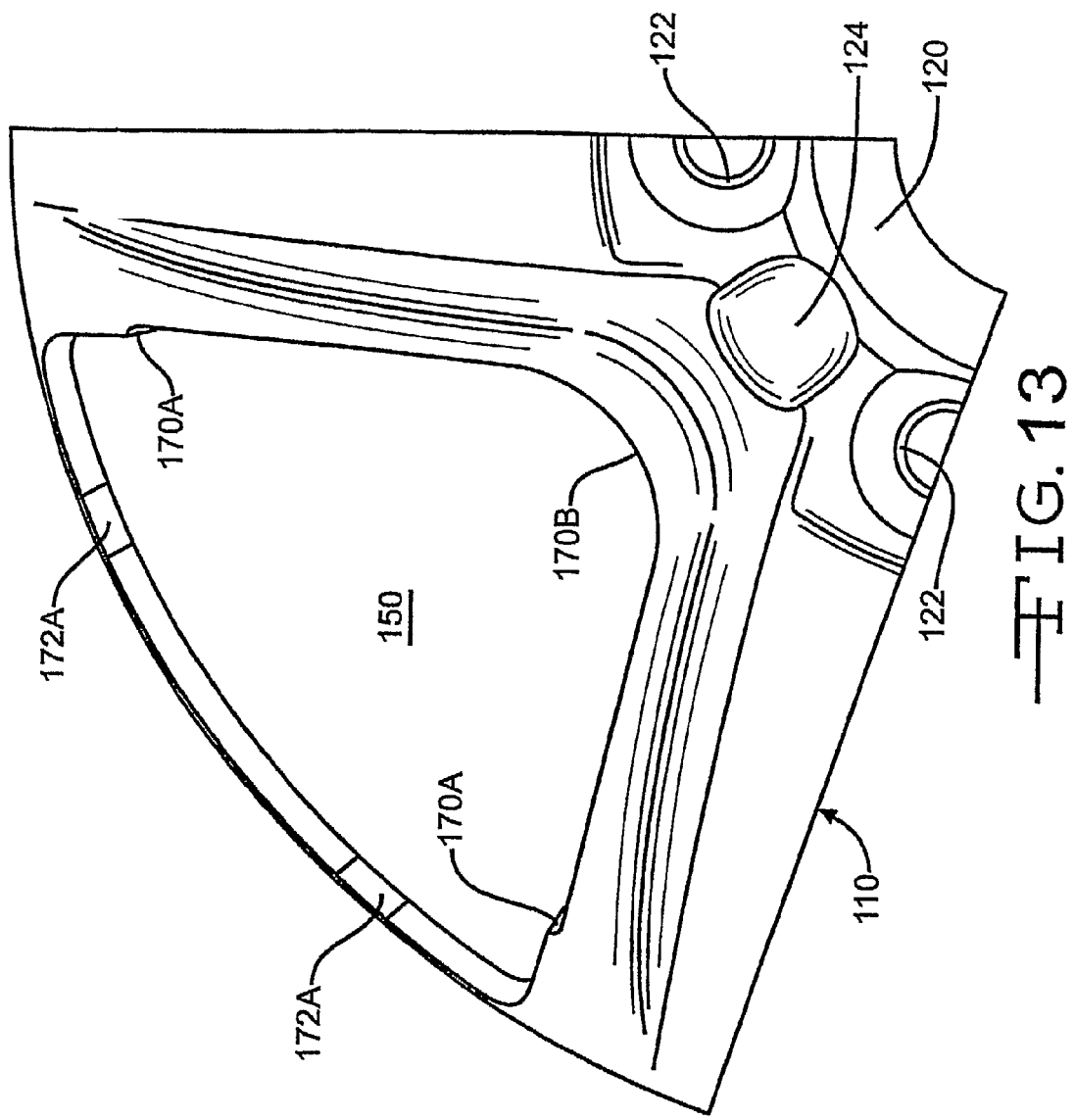
FIG. 13 is another view of the wheel disc in accordance with the present invention.

The first plane is generally perpendicular with respect to an axis X1 of the wheel disc 10 and is illustrated by arrow 160 in FIGS. 10 and 11. The second plane is at an angle with respect to the axis X1 of the wheel disc 10 and is illustrated by arrow 162 in FIG. 10. The angle of the second plane is in the range of from about 0 degrees to about 45 degrees. Preferably, the angle of the second plane is approximately 30 degrees. The third plane is generally at an angle with respect to the axis X1 of the wheel disc 10 and is illustrated by arrows 164 and 166 in FIGS. 10 and 11. The angle of the third plane is in the range of from about 0 degrees to about 45 degrees. Preferably, the angle of the third plane is approximately 30 degrees. Also, the third plane is preferably generally parallel or in line with respect to an axis defined by the associated adjacent radially extending spoke side wall 132 and 134, one of such axis generally being shown in FIG. 10 by arrow 170 with respect to spoke side wall 132.

Preferably, as illustrated, the rim connecting flange 154 extends solely in an axial direction and is joined to an associated surface of a wheel rim (not shown) by suitable means to produce the fabricated vehicle wheel. The wheel disc 110 can be joined to the wheel rim by any suitable method, such as for example, by welding or riveting. The rim connecting flange 154 defines a side edge surface 154A extending between adjacent pairs of the spokes 114. Alternatively, the rim connecting flange 154 can be other than illustrated if so desired. For example, the rim connecting flange 154 can be non-continuous, i.e., can include a separate, individual section(s) provided at an outer end of each of the spokes 114 or can be eliminated and the outer end of each of the spokes 114 can be directly connected to the wheel rim.

Figure 9:
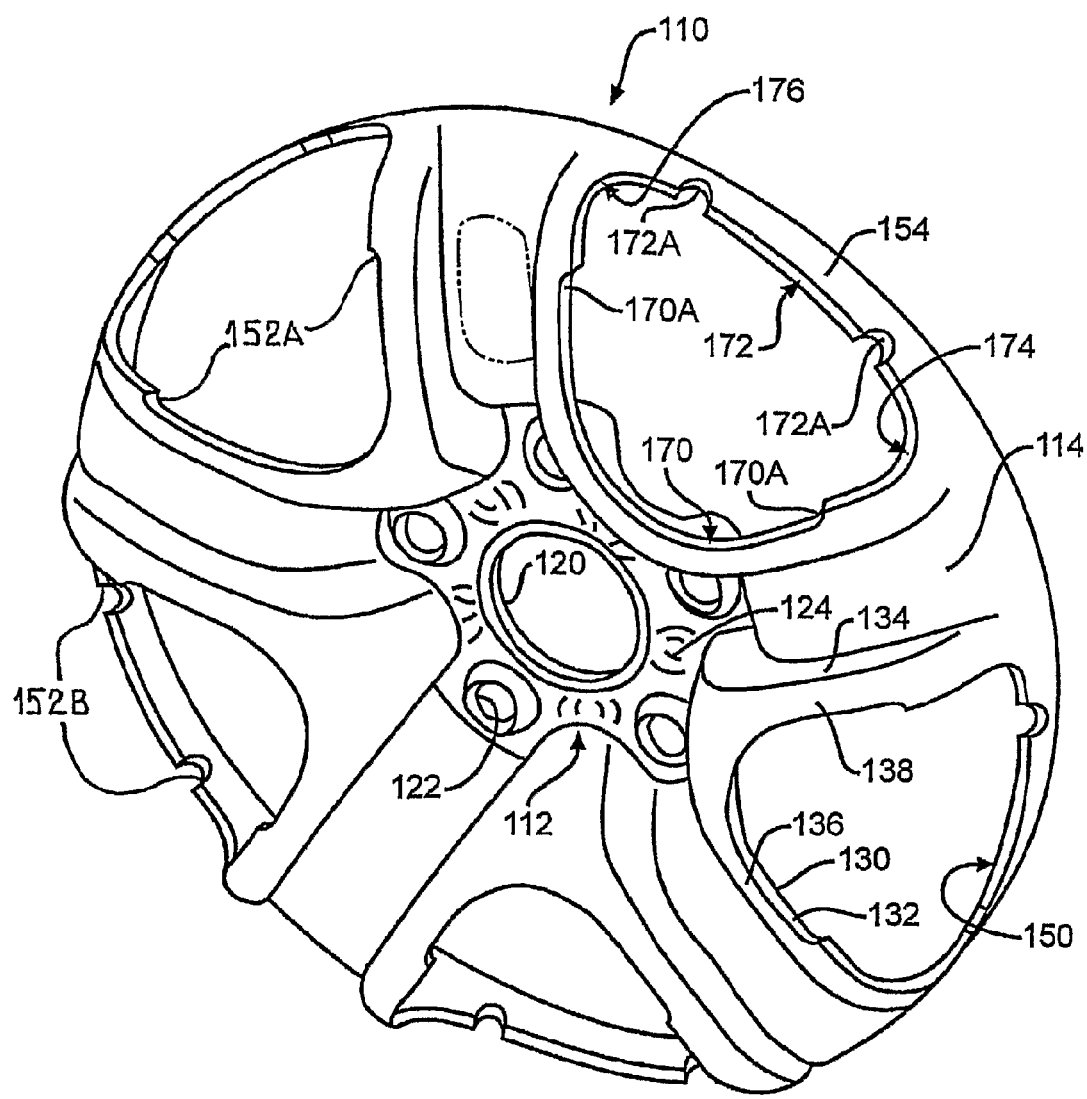
FIG. 9 is a perspective view of a second embodiment of a wheel disc according to the present invention adapted for use in producing a fabricated vehicle wheel.

In the illustrated embodiment, each of the windows 150 is identical to one another and has pair of clearance openings or zones, identified generally at 152A and 152B in FIG. 9. Each of the windows 150 is formed in the wheel disc 110 between adjacent pairs of the spokes 114 and has a predetermined shape defined by the adjacent pairs of spokes and the side edge surface 154A of the rim connecting flange 154 such that each of the windows 150 extends to an outermost periphery of the wheel disc 110. Alternatively, the shape of one or more of the windows 150 can be other than illustrated if so desired. Also, one or more of the planes can be other than the planes illustrated by the arrows 160, 162 and 164 if so desired.

Figure 14:
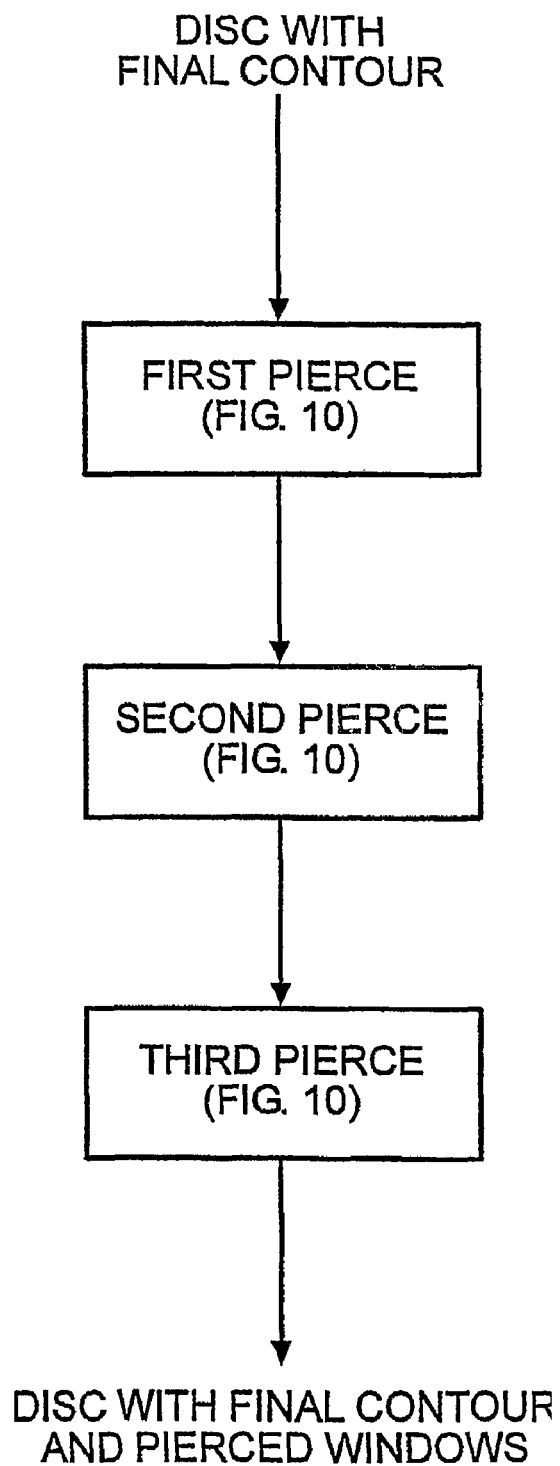
FIG. 14 is a block diagram illustrating a sequence of steps for producing the wheel disc in accordance with the present invention.

Referring now to FIG. 14, there is illustrated a block diagram showing a sequence of steps for producing the wheel disc 10 of the present invention, as illustrated in FIG. 9. Initially, in step 160, a preformed fabricated wheel disc having a final contour or shape is subjected to a first window piercing operation to produce a portion of the window 150 in the wheel disc 110. In the illustrated embodiment and according to one method of forming the windows 150, during step 160 a first or "inner" window portion 170 is formed in the wheel disc during a first pierce operation by a first punch P3 which is moved in the direction of arrow 160, as shown in FIGS. 10 and 11. As shown therein, the first window portion 170 includes a pair of cut-outs or openings 170A formed at the associated remote ends thereof. The openings 170A define a break or departure from the rest of a profile 170B of the first window portion 170 for a purpose similar to that discussed above with respect to the openings 72B in the window 50 of the disc 10.

Next, in step 162, a second or "intermediate outer" window portion 172 is formed in the wheel disc 110 during a second pierce operation by a second punch P4 which is moved in the direction of arrow 162, as shown in FIG. 10. As shown therein, the second window portion 172 includes a pair of openings 172A formed at the associated remote ends thereof.

In the illustrated embodiment, the shape of the openings 172A are generally in the shape of a semi-circle. The openings 172A define a break or departure from a profile 172B of the second window portion 172 for a purpose to be discussed below. Alternatively, the shape of one or both of the openings 170A and 172A can be other than illustrated if so desired. For example, the openings 170A and 172A could be generally oval-shaped, triangular-shaped, square or any other suitable shape if so desired.

Next, in step 164, a pair of third or "opposed outer end" window portions 174 and 176 are formed in the wheel disc 110 during a third pierce operation by a pair of third punches P5 and P6 which are moved in the directions of arrows 164 and 166, respectively, as shown in FIGS. 10 and 11. Preferably, the third punches P5 and P6 are operated simultaneously with one another to form the windows 174 and 176 in the disc at the same time; however, if desired, the third punches P5 and P6 could be operated separately if so desired. Alternatively, the shape, the number and/or the method of forming the windows 150 in the disc 110 can be other than illustrated and described if so desired. For example, the order of forming the first window portion 170, the second window portion 172 and the third window portions 174 and 176 in the wheel disc 110 can be in any other order if so desired. One alternate example is to form the window portion 172 first, then form the window portions 174 and 176 and then finally form the window portion 170. Another alternate example is to form the window portion 174, then form the window portion 170, then form the window portion 176, and finally form the window portion 170. Thus, it can be seen that there are a numerous ways to form the window using the punches P3, P4, P5 and P6. Also, it is preferred that the disc with final contour provided prior to step 160 is fully finish formed except for the windows 150. However, the disc provided prior to step 160 can be non fully finished if so desired. For example, following step 162, additional finishing operations, such as piercing the lug bolt holes 122 and the center pilot hole 120, can be performed.

The openings 170A and 172A formed in the windows 150 are operative to define or provide clearance or overlapping zones, identified in FIG. 9 by reference numbers 152A and 152B, respectively. The clearance zones 152A and 152B eliminates the concern of positioning the at least three window piercing operations exactly. In other words, without the clearance zones 152A and 152B, it would be difficult to precisely line up or align the profiles of the associated window portions which are formed during the at least three piercing operations. The clearance zones 152A and 152B also reduce or eliminate the possibility of a rough edge due to non exact alignment of the at least three window piercing operations. Additionally, the exact shape of the clearance zones 152A and 152B can be preselected and thereby incorporated into the final shape of the windows 150 of the wheel disc 110 if so desired.

One advantage of the present invention is that the multiple window piercing operations (e.g., the two steps in the first embodiment and the three steps in the second embodiment), allows the forming of a relatively large window 50, 150 in the wheel disc 10, 110 through more than one plane. Also, the openings (e.g. the openings 72A in the first embodiment and the openings 170A and 172A in the second embodiment), formed during the window piercing operations are operative to define or provide the clearance or overlapping zones (zones 52 in FIG. 2 and zones 152A and 152B in FIG. 9). The clearance zones eliminate the concern of positioning the multiple window piercing operations exactly. In other words, without the clearance zones, it would be difficult to precisely line up or align the profiles of the respective window portions with one another which are formed during the multiple piercing operations. The clearance zones also reduce or eliminate the possibility of a rough edge due to non exact alignment of the multiple window piercing operations. Additionally, the exact shape of the clearance zones can be preselected and thereby incorporated into the final shape of the windows of the wheel disc.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for producing a fabricated vehicle wheel comprising the steps of:
    (a) providing a wheel rim;
    (b) providing a wheel disc defining an axis and having a wheel mounting surface, a plurality of outwardly extending spokes and an outer rim connecting flange defining a side edge surface;
    (c) subjecting the wheel disc to at least a first window piercing operation to produce a first window portion in the wheel disc between a pair of adjacent spokes;
    (d) subjecting the wheel disc to at least a second window piercing operation to produce a second window portion in the wheel disc the first window portion and the second window portion cooperating to define a single pierced window in the wheel disc having a predetermined shape defined by the adjacent pairs of spokes and the side edge surface of the rim connecting flange such that each of the pierced window extends to an outermost periphery of the wheel disc; and
    (e) securing the wheel disc and the wheel rim together to produce the fabricated vehicle wheel.

2. The method for producing the fabricated vehicle wheel according to claim 1 wherein the first window portion is formed by piercing through a first plane of the wheel disc and the second window portion is formed by piercing through a second plane of the wheel disc.

3. The method for producing the fabricated vehicle wheel according to claim 2 wherein the first plane is generally parallel with respect to the wheel disc axis and the second plane is at an angle with respect to the wheel disc axis.

4. The method for producing the fabricated vehicle wheel according to claim 1 wherein further including the step of subjecting the wheel disc to a third window piercing operation to produce a pair of third window portions in the wheel disc, the first window portion, the second window portion and the third window portions cooperating to define a single pierced window in the wheel disc having a predetermined shape defined by the adjacent pairs of spokes and the side edge surface of the rim connecting flange such that each of the pierced window extends to an outermost periphery of the wheel disc.

5. The method for producing the fabricated wheel disc according to claim 4 wherein the first window portion is formed by piercing through a first plane of the wheel disc, the second window portion is formed by piercing through a second plane of the wheel disc, and the third window portions are formed by piercing through a third plane of the wheel disc.

6. The method for producing the fabricated vehicle wheel according to claim 5 wherein the first plane is generally parallel with respect to the wheel disc axis, the second plane is at an angle with respect to the wheel disc axis, and the third plane is at an angle with respect to the wheel disc axis.

7. The method for producing the fabricated vehicle wheel according to claim 6 wherein said spoke has a generally double-Z-shaped cross-section and includes a back wall, a pair of opposed side walls, and a pair of front walls, the back wall and the front walls extending generally parallel to one another, the third plane being generally parallel with respect to an axis defined by the side wall of the spoke.

8. The method for producing the fabricated vehicle wheel according to claim 1 wherein the pierced window includes at least two clearance zones, the two clearance zones being defined at the two connecting zones of the first window portion to the second window portion, the two clearance zones establishing a departure from a profile of the pierced window predetermined shape.

9. A method for producing a fabricated wheel disc comprising the steps of:
(a) providing a wheel disc defining an axis and having a wheel mounting surface, a plurality of outwardly extending spokes and an outer rim connecting flange defining a side edge surface;
(b) subjecting the wheel disc to at least a first window piercing operation to produce a first window portion in the wheel disc between a pair of adjacent spokes; and
(c) subjecting the wheel disc to at least a second window piercing operation to produce a second window portion in the wheel disc, the first window portion and the second window portion cooperating to define a single pierced window in the wheel disc having a predetermined shape defined by the adjacent pairs of spokes and the side edge surface of the rim connecting flange such that each of the pierced window extends to an outermost periphery of the wheel disc.

10. The method for producing the fabricated wheel disc according to claim 9 wherein the first window portion is formed by piercing through a first plane of the wheel disc and the second window portion is formed by piercing through a second plane of the wheel disc.

11. The method for producing the fabricated wheel disc according to claim 10 wherein the first plane is generally parallel with respect to the wheel disc axis and the second plane is at an angle with respect to the wheel disc axis.

12. The method for producing the fabricated wheel disc according to claim 9 wherein further including the step of subjecting the wheel disc to a third window piercing operation to produce a pair of third window portions in the wheel disc, the first window portion, the second window portion and the third window portions cooperating to define a single pierced window in the wheel disc having a predetermined shape defined by the adjacent pairs of spokes and the side edge surface of the rim connecting flange such that the pierced window extends to an outermost periphery of the wheel disc.

13. The method for producing the fabricated wheel disc according to claim 12 wherein the first window portion is formed by piercing through a first plane of the wheel disc, the second window portion is formed by piercing through a second plane of the wheel disc, and the third window portions are formed by piercing through a third plane of the wheel disc.

14. The method for producing the fabricated wheel disc according to claim 13 wherein the first plane is generally parallel with respect to the wheel disc axis, the second plane is at an angle with respect to the wheel disc axis, and the third plane is at an angle with respect to the wheel disc axis.

15. The method for producing the fabricated wheel disc according to claim 14 wherein said spoke has a generally double-Z-shaped cross-section and includes a back wall, a pair of opposed side walls, and a pair of front walls, the back wall and the front walls extending generally parallel to one another, the third plane being generally parallel with respect to an axis defined by the side wall of the spoke.

16. The method for producing the fabricated wheel disc according to claim 9 wherein the pierced window includes at least two clearance zones, the two clearance zones being defined at two connecting zones of the first window portion to the second window portion, the two clearance zones establishing a departure from a profile of the pierced window predetermined shape.

17. A method comprising the steps of:
(a) forming a first window portion in a wheel disc between a pair of adjacent spokes of the wheel disc and a side edge surface of a rim connecting flange of the wheel disc; and
(b) forming a second window portion in the wheel disc which cooperates with the first window portion to define a single pierced window in the wheel disc having a predetermined shape defined by the adjacent pairs of the spokes and the side edge surface of the rim connecting flange of the wheel disc such that the pierced window extends to an outermost periphery of the wheel disc;
wherein the first window portion is formed by piercing through a first plane of the wheel disc and the second window portion is formed by piercing through a second plane of the wheel disc.

18. The method according to claim 17 wherein the first plane is generally parallel with respect to the wheel disc axis and the second plane is at an angle with respect to the wheel disc axis.

19. The method according to claim 17 further including the step of subjecting the wheel disc to a third window piercing operation to produce a pair of third window portions in the wheel disc, the first window portion, the second window portion and the third window portions cooperating to define a single pierced window in the wheel disc having a predetermined shape defined by the adjacent pairs of spokes and the side edge surface of the rim connecting flange such that the pierced window extends to an outermost periphery of the wheel disc.

20. The method according to claim 19 wherein the first window portion is formed by piercing through a first plane of the wheel disc, the second window portion is formed by piercing through a second plane of the wheel disc, and the third window portions are formed by piercing through a third plane of the wheel disc.

21. The method according to claim 20 wherein the first plane is generally parallel with respect to the wheel disc axis, the second plane is at an angle with respect to the wheel disc axis, and the third plane is at an angle with respect to the wheel disc axis.

22. The method according to claim 21 wherein said spoke has a generally double-Z-shaped cross-section and includes a back wall, a pair of opposed side walls, and a pair of front walls, the back wall and the front walls extending generally parallel to one another, the third plane being generally parallel with respect to an axis defined by the side wall of the spoke.

23. The method according to claim 17 wherein the pierced window includes at least two clearance zones, the two clearance zones being defined at the two connecting zones of the first window portion to the second window portion, the two clearance zones establishing a departure from a profile of the pierced window predetermined shape.

* * * * *

UNITED STATES PATENT AND TRADEMARK OFFICE
CERTIFICATE OF CORRECTION

PATENT NO. : 7,984,551 B2  
APPLICATION NO. : 10/591682  
DATED : July 26, 2011  
INVENTOR(S) : Patrick McCorry et al.

Page 1 of 1

It is certified that error appears in the above-identified patent and that said Letters Patent is hereby corrected as shown below:

Column 8, Claim 1, subparagraph (d), line 28, after "disc" insert a --,--;
  line 32, after "that" delete the words "each of".

Column 8, Claim 4, line 54, after "that" delete the words "each of".

Column 9, Claim 8, line 11, after "defined at" delete the word "the".

Column 9, Claim 9, subparagraph (c), line 31, after "that" delete the words "each of".

Signed and Sealed this

Thirteenth Day of September, 2011

David J. Kappos
*Director of the United States Patent and Trademark Office*